United States Patent [19]

Bretz et al.

[11] Patent Number: 5,421,860
[45] Date of Patent: Jun. 6, 1995

[54] SORPTION OF ORGANIC COMPOUNDS FROM FLUIDS

[75] Inventors: Karl-Heinz Bretz, Nienburg/Weser; Kristen Fuhrmann, Wunstorf; Michael Hoffmeister, Hanover; Peter Engelmann, Garbsen; Andreas Meyer-Anderson, Bremen; Egon Schultz, Lehrte; Alf-Eric Wischnat, Lehrte; Helmut Derleth, Nienburg/Weser; Norbert Schwetje, Hanover, all of Germany

[73] Assignee: Engelhard Process Chemicals GmbH, Iselin, N.J.

[21] Appl. No.: 62,596

[22] Filed: May 18, 1993

[30] Foreign Application Priority Data

May 22, 1992 [DE] Germany .......................... 42 16 867.8

[51] Int. Cl.$^6$ ............................................. B01D 53/04
[52] U.S. Cl. ......................................... 95/115; 95/141; 95/143; 96/153; 96/154
[58] Field of Search ............................. 95/115, 141–148, 95/901, 902; 96/153, 154

[56] References Cited

U.S. PATENT DOCUMENTS

| 3,803,033 | 4/1974 | Sutherland | 210/40 |
|---|---|---|---|
| 4,013,587 | 3/1977 | Fischer et al. | 252/448 |
| 4,036,747 | 7/1977 | Hori et al. | 210/22 A |
| 4,056,369 | 11/1977 | Quackenbush | 95/115 X |
| 4,058,483 | 11/1977 | Henbest | 252/446 |
| 4,203,734 | 5/1980 | Winter et al. | 95/115 |
| 4,206,078 | 6/1980 | Ohorodnik et al. | 252/423 |
| 4,337,276 | 6/1982 | Nakamura et al. | 96/153 X |
| 4,377,396 | 3/1983 | Krauss et al. | 95/141 |
| 4,518,704 | 5/1985 | Okabayashi et al. | 96/153 X |
| 4,601,992 | 7/1986 | Derleth et al. | 502/64 |
| 4,677,086 | 6/1987 | McCue et al. | 96/153 X |
| 4,713,090 | 12/1987 | Yokoe et al. | 95/901 X |
| 4,788,359 | 11/1988 | Schuchardt et al. | 95/115 X |
| 4,795,735 | 1/1989 | Liu et al. | 502/415 |
| 4,869,739 | 9/1989 | Kanome et al. | 96/153 |

FOREIGN PATENT DOCUMENTS

| 0002251 | 7/1981 | European Pat. Off. . | |
|---|---|---|---|
| 278061 | 8/1988 | European Pat. Off. . | |
| 343697 | 11/1989 | European Pat. Off. . | |
| 369171 | 5/1990 | European Pat. Off. . | |
| 2313967 | 1/1977 | France . | |
| 350260 | 3/1922 | Germany . | |
| 1038015 | 9/1958 | Germany . | |
| 2917313 | 11/1980 | Germany . | |
| 52-063868 | 5/1977 | Japan | 95/141 |
| 1188873 | 4/1970 | United Kingdom . | |
| 1421381 | 9/1988 | U.S.S.R. | 95/141 |

OTHER PUBLICATIONS

Derwent Abstract of JP 1,278,408.
Derwent Abstract of DD 283,279.
Chemical Abstracts 107:12172y (1987): Abstract of JP 62/82,966.
BASF "Kieselgele fuer die Adsorption von Gasen und Fluessigkeiten" (Silicagels for Adsorption of Gases and Liquids).

*Primary Examiner*—Robert Spitzer
*Attorney, Agent, or Firm*—Evenson, McKeown, Edwards & Lenahan

[57] ABSTRACT

A method for the sorption of organic compounds using a sorbent, comprising activated carbon in a preferably amorphous oxidic support is described. Novel sorbents are also described.

15 Claims, No Drawings

SORPTION OF ORGANIC COMPOUNDS FROM FLUIDS

BACKGROUND OF THE INVENTION

This invention relates to a method for the sorption of organic compounds from fluids using a sorbent comprising activated carbon carried by an oxidic support. The invention furthermore relates to a novel sorbent which can be used in this method.

It is already known to sorb organic compounds from gases using activated carbon. This procedure, however, is subject to the disadvantage that the activated carbon is in finely divided form so that it is difficult to handle and also may contaminate the gas to be purified. Furthermore, energy costs to regenerate the carbon are high, since regeneration is usually carried out using superheated steam due to the risk of fire.

SUMMARY OF THE INVENTION

It is an object of the invention to provide an improved method for sorption of organic compounds from fluids.

Another object of the invention is to provide a method for sorption of organic compound from fluids which acts selectively.

A further object of the invention is to provide a method for sorption of organic compounds from fluids which uses a sorbent which is easy to handle.

It is also an object of the invention to provide a method for sorption of organic compounds from fluids which avoids contamination of the fluid which is being treated.

Yet another object of the invention is to provide a method for sorption of organic compounds from fluids that uses a sorbent which can be regenerated at comparatively low energy cost.

These and other objects of the invention are achieved by providing a method for sorption of an organic compound from a fluid which contains the organic compound, wherein the method comprises contacting the fluid with a sorbent comprising particulate activated carbon carried by an oxidic support formed from $SiO_2$, $Al_2O_3$, aluminium phosphate or aluminosilcate.

In accordance with a further aspect of the invention, the objects are achieved by providing a sorbent for sorption of an organic compound from a fluid, wherein the sorbent comprises particulate activated carbon carried by an oxidic support formed from $SiO_2$, $Al_2O_3$, aluminium phosphate or aluminosilicate.

The method according to the invention for the sorption of organic compounds from fluids using activated carbon is characterized in that a sorbent is used which comprises particulate activated carbon in an oxidic support composed of $SiO_2$, $Al_2O_3$, aluminum phosphate or aluminosilicate.

As used herein, the term "activated carbon" also comprises activated carbon soot, activated carbon coke and graphite, but not activated carbon molecular sieve. The term "fluids" is intended to embrace both gases and liquids.

The particle size of the activated carbon should advantageously be in the range from 50 to 50,000 nm. It is preferably in the range from 50 to 10,000 nm.

The activated carbon content in the sorbent may vary over a wide range, e.g. between 0.1 and 90% by weight, relative to the total weight of the sorbent. The sorbent preferably will contain from 0.5 to 70% by weight activated carbon, in particular from 5 to 40% by weight.

In accordance with one, particularly advantageous, variant of the invention, the particulate activated carbon is uniformly (homogeneously) distributed within the sorbent.

In accordance with another variant of the invention, the distribution of the activated carbon in the sorbent is non-homogenous, such that the concentration in the peripheral or outer region of the sorbent is higher than in the interior. Sorbents which are coated with activated carbon can be produced by subsequent application of the activated carbon to the support.

Amorphous and/or crystalline material can be used as the oxidic support. Amorphous oxidic supports, which may contain crystalline material, are highly suitable. Amorphous oxidic supports composed of $SiO_2$ or aluminosilicate, especially $Si_2$, are particularly well suited for use in the method according to the invention.

If the sorbent contains crystalline material, e.g. zeolites or aluminium phosphate, then the amount of such crystalline material is advantageously in the range from 0.5 to 50% by weight, relative to the total weight of the sorbent. The pore size of the amorphous oxidic material is advantageously in the range from 1 to 10,000 nm.

The sorbent may take any desired form, e.g. granules, extruded bodies, or a monolith. It is advantageously in the form of particles having a size of at least 0.1 mm. A sorbent which is bead-shaped is particularly preferred. The diameter of these bead-shaped particles is advantageously in the range from 0.5 to 10 mm, preferably from 1 to 6 mm. Sorbents which have other shapes, however, may likewise be used.

The temperature at which the method according to the invention is performed is between $-70°$ C. and the desorption temperature, advantageously in the range between 10 and $40°$ C.

It is possible to operate at standard pressure (ambient pressure), but also at reduced pressures, e.g. down to 0.1 millibar, or at elevated pressures of up to 50 bar.

The sorbent laden with sorbed organic compound may be regenerated again by heating. One preferred embodiment of the method according to the invention provides for regenerating and re-using the laden sorbent. The desorption is preferably carried out at a temperature between 35 and $200°$ C., in particular 60 to $180°$ C. In this case, it has proved to be an advantage, compared with pure activated carbon, that the sorbent in accordance with the present invention is more flame-resistant, especially if the activated carbon content is less than 70% by weight. The regeneration may be effected simply by heating, without using superheated steam, which makes an energy-consuming drying step necessary. If desired, however, it is of course possible to regenerate with superheated steam. In addition to these advantages, the sorbent to be used in the method according to the invention additionally has the advantage that the catalytic decomposition of the sorbed organic compounds upon regeneration is considerably less than when pure activated carbon or zeolites are used as sorbents. It is frequently not possible to detect any catalytic decomposition. Furthermore, the method according to the invention operates with a high degree of selectivity.

The process according to the invention can be used to remove any material known to be sorbed by activated carbon, from gases or liquids, particularly from aqueous solutions. Whether a specific organic material is sorbed can be readily determined in most cases by simply contacting a gas or a liquid containing the material with a sorbing agent according to the invention and then subsequently analyzing the gas or liquid. Substances which can be removed include both polar and nonpolar compounds, gaseous or vaporized compounds, liquids or substances dissolved in liquids, particularly in aqueous solutions. The invention is especially useful to sorb gases or vapors of organic compounds which are used as solvents. For example, substances which are formed only of carbon and hydrogen, for example, aliphatic or cycloaliphatic hydrocarbons, such as gasoline, or aromatic hydrocarbons such as benzene, toluene or xylene, can be sorbed using the process of the invention. One can also sorb compounds which in addition to carbon, also contain heteroatoms such as nitrogen, oxygen or sulfur, halogens and/or phosphorus, and possibly hydrogen. Thus, halocarbons, halohydrocarbons, for example, chlorocarbons, chlorohydrocarbons, chlorofluorocarbons, chlorofluorohydrocarbons, fluorocarbons, fluorohydrocarbons, alcohols, ketones, carboxylic acids, aldehydes, aliphatic, cycloaliphatic or aromatic ethers, alkylated phosphorus compounds, and/or alkylated sulfur compounds can be removed. From the foregoing it should be understood that just about any organic material can be sorbed according to the process of the invention, provided it exists in gas or vapor, liquid or solution form.

It is recommendable not to operate under conditions which could cause destruction of the carrier. This applies in particular when contacting aqueous solutions. Conditions which lead to destruction of oxidic carriers are known to persons skilled in the art. Thus, if $SiO_2$ is used as an oxidic carrier, the pH value of the solution to be contacted should not be too highly alkaline, preferably not above pH 10. When aluminum oxide is used, the pH value of the solution to be treated should not be too strongly acidic, preferably not lower than pH 5.

It is particularly noteworthy that it is possible using the process of the invention to sorb aromatic hydrocarbons such as benzene, toluene and/or xylene with a high degree of selectivity from gas streams which also contain water.

For example, the method of the invention may be used to treat waste gases from production processes in which such organic compounds are produced or are used as starting compounds or solvents, e.g. exhaust air from paint shops or printing plants, or other industrial waste gases.

The present invention also relates to a sorbent which can be used in the method of the invention. The sorbent according to the invention comprises particulate activated carbon carried by an oxidic support formed of $SiO_2$, $Al_2O_3$, aluminium phosphate or aluminosilicate. The preferred embodiments of the sorbent according to the invention correspond to those which are used in preferred embodiments of the method of application.

A particularly preferred sorbent is bead-shaped with a diameter of 0.5 to 10 mm, and comprises from 0.5 to 70% by weight activated carbon having a particle size of 50 to 10,000 nm carried by an amorphous oxidic support formed of $SiO_2$, which may optionally also comprise 0.5 to 50% by weight of crystalline material such as a zeolite or aluminium phosphate, based on the total weight of the sorbent. The pore size of the particularly preferred sorbent lies in the range from 1 to 10,000 Å, preferably from 5 to 10,000Å, particularly preferably from 25 to 10,000 Å.

Methods for producing the sorbent according to the invention will now be described. The production of oxidic materials formed of amorphous or crystalline $SiO_2$, $Al_2O_3$, aluminium phosphate or aluminosilicate is known to persons skilled in the art. Crystalline aluminosilicate, for example, can be produced analogously to the method described in Examined German Patent Application No. DE-AS 1,038,015. In this process, sodium aluminate solution and sodium silicate solution are mixed together to form a gel, and are caused to crystallize. Various zeolites can be produced, depending on the molar ratio of silicon and aluminium. Sorbents according to the invention can be produced by mixing zeolite, binder and activated carbon and consolidating them, e.g. by granulation.

Amorphous aluminosilicates may be produced analogously to the method described in Published German Patent Application No. DE-OS 2,917,313. In this process, an aluminate solution and a silicate solution are combined. If the mixture is introduced immediately into a precipitating oil, bead-shaped bodies of amorphous aluminosilicate form. In order to produce a sorbent according to the invention, activated carbon is added to one or both starting solutions.

A further way of producing a sorbent according to the invention is to combine (acidic) aluminium sulfate and silicate solutions with each other and convert them into amorphous aluminosilicate. Again in this case, activated carbon is added to one or both solutions. If the solutions which have been mixed together are immediately introduced into a precipitating oil, bead-shaped bodies are again obtained.

A sorbent according to the invention formed of amorphous $SiO_2$ is obtained if activated carbon is mixed into a silicate solution and then combined with an acid solution. Alternatively, activated carbon could also be admixed with the acid solution. If added dropwise into a precipitating oil, bead-shaped bodies are again obtained. In addition to the activated carbon, crystalline constituents such as zeolites may also be included in the admixture.

Alternatively, amorphous oxidic materials may be coated with activated carbon, e.g. by spraying with a suspension of activated carbon in water. Of course, sorbents according to the invention may also be subsequently treated in this manner.

Following the production process according to the invention, conventional further steps may be carried out, such as ageing, base exchange, washing, de-ionizing, drying and/or tempering.

Particularly advantageous sorbents are obtained if the precipitated oxidic material is dried after ageing and before being subjected to base exchange.

The following examples are intended to illustrate the invention in further detail without limiting its scope.

EXAMPLES 1 to 11

Production of sorbents composed of amorphous, wide-pored $SiO_2$ containing activated carbon. General production directions:

A sodium silicate solution containing 6.30% by weight $Na_2O$ and 21.16% by weight $SiO_2$ and having a density of $d_{20}=1.256$ was used as the source of the amorphous $SiO_2$. Activated carbon or graphite, and optionally wide-pored $SiO_2$ (finely divided particles having a pore diameter of 20 to 30 Å), were admixed with the sodium silicate solution in the form of an aqueous suspension (mash). Precipitation was effected by mixing with an acidic solution which was an aqueous sulfuric acid having a concentration of 7.87% by weight $H_2SO_4$ and a density of $d_{20}=1.049$. Upon mixing of the alkaline and acidic solutions, a pH value of 6.9 was obtained. The mixture was introduced immediately into a precipitating oil, and the resulting beads, optionally after ageing, were washed until they were free of sulfate. Then base exchange was carried out by contacting the beads 5 times for 3 hours each time with sulfuric acid containing 0.5% by weight $H_2SO_4$. The mixture was then dried for 3.5 hours at 180° C. with steam in a circulating dryer. Then tempering was performed. In Example 5, drying was carried put after ageing, and the dried bead-shaped bodies were subjected to a base exchange by being contacted five times for 3 hours each time with sulfuric acid having a concentration of 0.5% by weight $H_2SO_4$ and then washed until they were free of sulfate. In Example 1, 0.5% by weight $Al_2(SO_4)_3$ solution was used instead of sulfuric acid.

EXAMPLES 12 and 13

Bead-shaped amorphous $SiO_2$ in the form of the commercial product "AF25 TM", produced by Solvay Catalysts GmbH was used. These are beads having a diameter of 2 to 6 mm. These beads were sprayed with aqueous graphite suspension and then dried for 18 hours at 200° C.

The process parameters and properties of the resulting sorbents are compiled in the following Table 1:

EXAMPLES 14 to 17

Use of sorbents for toluene adsorption.
General directions:

Before use, the sorbents to be used were activated for 16 hours at 160° C. Nitrogen laden with 1000 ppm toluene and 3000 ppm $H_2O$ was used as the test gas. The space velocity was 1,200 liters per hour and liter of sorbent, and the contact time was 3 seconds.

The equilibrium load, given in % by weight, was determined from the gradients of the breakthrough curves by integration. The toluene selectivity is defined as $$TS[\%] = \frac{\text{Toluene load [\% by weight]}}{\text{Total load [\% by weight]}}$$

The characteristic data from the tests is compiled in the following Table 2. It can be seen from Table 2 that the toluene selectivity of the sorbents according to the invention is very high.

After thermal regeneration at 180° C., the beads were re-used for selective toluene sorption with good results.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

TABLE 1

| Example | Mash used | Content of the mash [% by weight] | Average particle size [microns] (8) | Volume ratio mash; water-glass | Ageing [h] | Tempering h; °C. | Compacted bulk density [g/ml] | Pore volume [ml/g] | Surface area [m²/g] | Bursting pressure [kg] | Content of activated carbon or graphite [% by weight] |
|---|---|---|---|---|---|---|---|---|---|---|---|
| 1 | Activated carbon (1) | 13.8 | 4.7 | 0.438 | 2 | 18/200 | | 0.91 | 817 | 2.7 | 20 |
| 2 | Graphite | 21.4 | 8.6 | 0.375 | 2 | 18/200 | 0.53 | 0.63 | 680 | | 3 |
| | $SiO_2$ wide-pored | 21.4 | 4.2 | | | | | | | | |
| 3 | Graphite | 21.4 | 8.6 | 0.375 | 2 | 18/200 | 0.59 | | | | 11.3 |
| | $SiO_2$ wide-pored | 21.4 | 1.8 | | | | | | | | |
| 4 | Activated carbon (2) | 16.1 | 4.8 | 0.411 | 18 | 18/200 | 0.40 | 1.01 | 675 | 1.4 | 6.4 |
| 5 | Activated carbon (2) | 21.4 | 5.2 | 0.411 | 18 | 4/180 + 18/200 | 0.41 | 1.07 | 285 | 7.2 | 6.4 |
| 6 | Activated carbon (3) | 15.3 | 2.8 | 0.395 | 4 | 6/200 | | 0.79 | 758 | 3.7 | 20 |
| 7 | Activated carbon (3) | 13.0 | 2.8 | 0.464 | 4 | 6/200 | 0.49 | 0.73 | 739 | 2.9 | 20 |
| 8 | Activated (4) carbon (11) | 15.5 | 2.6 | 0.390 | 4 | 6/200 | 0.43 | 0.90 | 745 | 0.9 | 20 |
| 9 | Activated (5) carbon (12) | 10.8 | 2.8 | 0.562 | 4 | 6/200 | 0.48 | 0.76 | 719 | 3.2 | 20 |
| 10 | Activated carbon (6) | 14.3 | 0.9 | 0.423 | 4 | 6/200 | | 0.95 | 592 | | 20 |
| 11 | Activated (7) carbon (13) | 12.1 | 1.4 | 0.500 | 4 | 6/200 | 0.52 | 0.68 | 722 | 6.9 | 20 |
| 12 | Graphite | 21.4 | 8.6 | (9) | — | 18/200 | 0.48 | | | | 8.0 |
| 13 | Graphite | 21.4 | 8.6 | (10) | — | 18/200 | 0.47 | | | | 4.2 |

Explanations for Table 1:
(1) Product Lurgi AS 4/420 TM
(2) A-Kohle Riedel 18003 TM
(3) Norit P1 TM, American Norit Co
(4) Lurgi Carbopol SC 44/1 TM
(5) Lurgi Gn-A TM
(6) Degussa Flammruss TM
(7) Norit SA 1 TM
(8) $d_{50}$, determined according to the Cilas method
(9) finished $SiO_2$ beads sprayed
(10) finished $SiO_2$ beads sprayed
(11) loose bulk density: 0.40 g/ml
(12) loose bulk density: 0.45 g/ml
(13) loose bulk density: 0.48 9/ml

TABLE 2

| Beads from Example | Composition (% by weight) | activated carbon beads BET surface area (m²/g) | Equilibrium load (% by weight) Total H₂O | Toluene | Toluene selectivity % |
|---|---|---|---|---|---|
| 5 | 6.4% A-carbon, remainder SiO₂ | 285 | 6.14 | 5.07   1.07 | 82.5 |
| 6 | 20% -"- | 758 | 14.2 | 11.5   2.7 | 80 |
| 11 | 20% -"- | 722 | 16.33 | 14.2   2.1 | 86.9 |

What is claimed is:

1. A method for sorption of an organic compound from a flowing fluid stream containing said organic compound, said method comprising the steps of contacting said flowing fluid stream with a particulate sorbent wherein the particles comprise activated carbon fixedly carried by an amorphous oxidic support formed from SiO₂, Al₂O₃, aluminum phosphate or alumosilicate.

2. A method according to claim 1, wherein the particulate activated carbon has a particle size of 50 to 10,000 nm.

3. A method according to claim 1, wherein said sorbent comprises from 0.5 to 70% by weight activated carbon.

4. A method according to claim 1, wherein the particulate activated carbon is uniformly distributed within said sorbent particles.

5. A method according to claim 1, wherein said sorbent further comprises particles of zeolite.

6. A method according to claim 1, wherein said oxidic support comprises beads of amorphous SiO₂ or aluminosilicate.

7. A method according to claim 1, further comprising recovering sorbent laden with sorbed organic compound from said contacting step, heating the recovered sorbent at a temperature of from 35 to 200° C. to regenerate the sorbent without using superheated steam, and recycling regenerated sorbent to said contacting step.

8. A method according to claim 1, wherein said fluid is a gas.

9. A method according to claim 1, wherein said activated carbon is particulate activated carbon which is coated on said sorbent particles.

10. A sorbent for sorption of an organic compound from a fluid, said sorbent comprising particulate activated carbon fixedly carried by an oxidic support formed from SiO₂, Al₂O₃, aluminum phosphate or aluminosilicate.

11. A sorbent according to claim 10 wherein said support further comprises a crystalline material.

12. A sorbent according to claim 11, wherein said crystalline material is a crystalline zeolite.

13. A sorbent according to claim 10, wherein said oxidic support is formed from amorphous SiO₂ or aluminosilicate.

14. A sorbent according to claim 13, wherein said particulate activated carbon has a particle size of from 50 to 10,000 nm.

15. A sorbent according to claim 14, wherein said sorbent contains from 10 to 70% by weight particulate activated carbon.

* * * * *